United States Patent [19]

Tanabe et al.

[11] Patent Number: 4,683,993

[45] Date of Patent: Aug. 4, 1987

[54] HYDRAULIC DAMPER

[75] Inventors: Hisao Tanabe, Kanagawa; Masaru Takahashi, Tokyo; Hiroyasu Ozawa, Kanagawa; Shoichi Machida; Makoto Kitamura, both of Kanagawa, all of Japan

[73] Assignee: Tokico Ltd., Kanagawa, Japan

[21] Appl. No.: 804,257

[22] Filed: Dec. 3, 1985

[30] Foreign Application Priority Data

Dec. 4, 1984 [JP] Japan .......................... 59-184194[U]
Apr. 19, 1985 [JP] Japan ............................ 60-58645[U]

[51] Int. Cl.$^4$ .............................................. F16F 9/54
[52] U.S. Cl. .................................. 188/321.11; 267/34
[58] Field of Search ...................... 188/322.16, 321.11, 188/322.19; 267/34, 35, 64.24, 66; 280/660, 668

[56] References Cited

U.S. PATENT DOCUMENTS 3,263,983 8/1966 Bliven ................................. 267/34 X
4,089,511 5/1978 Palmer ................................ 267/34 X
4,366,969 1/1983 Benya et al. ....................... 267/34 X
4,534,545 8/1985 Fannin et al. ..................... 267/64.24

FOREIGN PATENT DOCUMENTS 2653006 5/1977 Fed. Rep. of
  Germany ....................... 188/321.11

Primary Examiner—Duane A. Reger
Attorney, Agent, or Firm—Wenderoth, Lind & Ponack

[57] ABSTRACT

A hydraulic damper includes a tubular main body, a piston rod slidably extending through one end of the tubular main body, an annular seat member secured to an outer peripheral wall of the tubular main body, a biasing device such as a coil spring or an air spring acting between the seat member and the tip end of the piston rod for biasing the piston rod in the extending direction, and a supporting member constituting a part of the biasing device and having a tubular portion which is slidingly fitted on the seat member. A resilient retaining member is provided on the seat member for engaging with a retaining recess formed in the inner circumferential surface of the tubular portion of the supporting member, thereby preventing the supporting member from escaping from the seat member.

3 Claims, 16 Drawing Figures

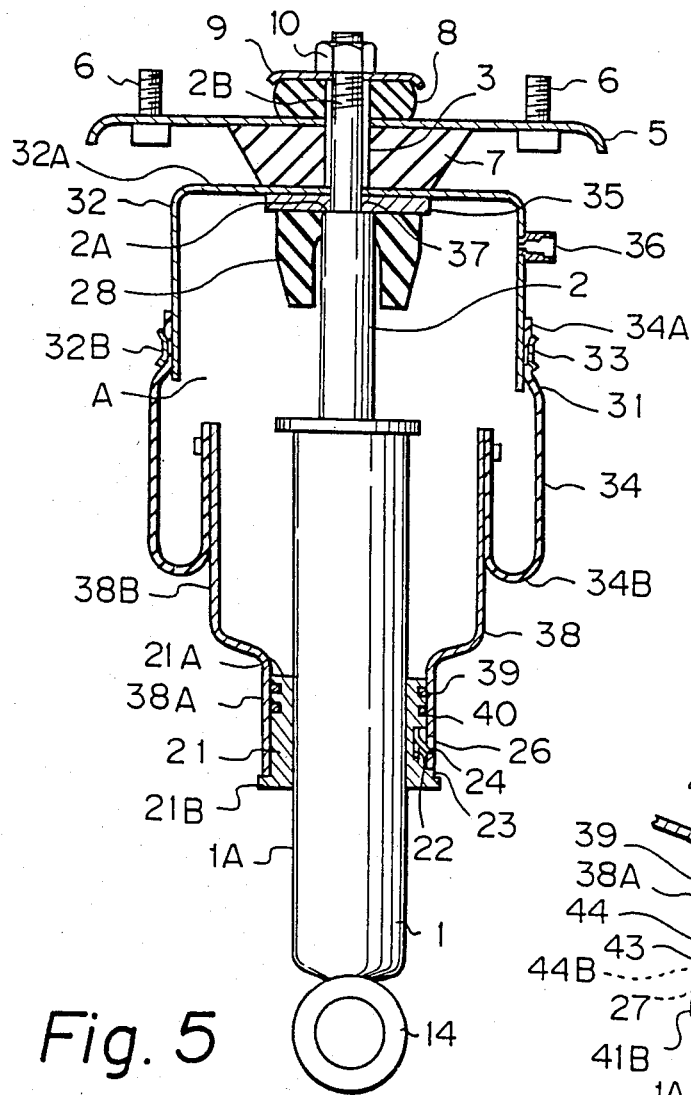
Fig. 3
Fig. 4
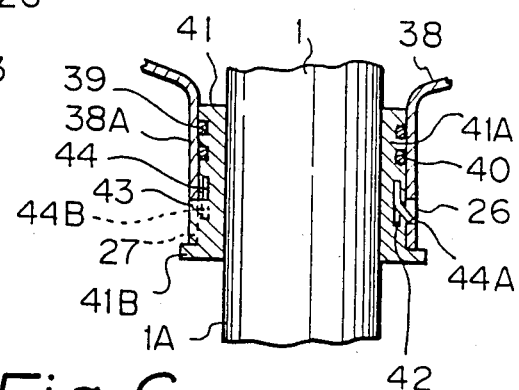
Fig. 5
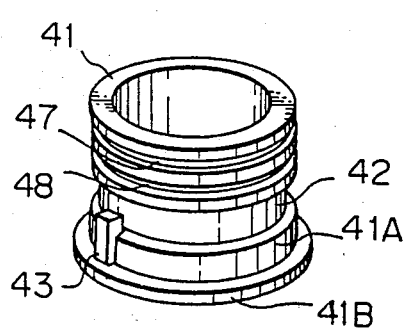
Fig. 6
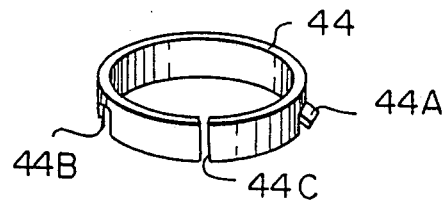

HYDRAULIC DAMPER

BACKGROUND OF THE INVENTION

This invention relates to a hydraulic damper for use in particular in a suspension system of vehicle such as an automobile.

Various types of hydraulic dampers have been developed and utilized in vehicle suspension systems.

FIG. 16 shows one typical prior art hydraulic damper which comprises a tubular main body 1, and a piston rod 2 slidingly projecting from the upper end of the main body 1. A small diameter portion 2B is defined on the upper end of the piston rod 2 through a shoulder portion 2A. A tubular sleeve 3 is fitted on the small diameter portion 2B for clamping an upper supporting member 4 of a dish-like configuration between the shoulder portion 2A and the sleeve 3. A bracket 5 is provided for mounting the hydraulic damper on a vehicle body through screws 6. Mounting rubbers 7 and 8 are provided on opposite sides of the bracket 5. A washer 9 is mounted on the upper side of the mounting rubber 8. A nut 10 is screw threadingly mounted on the rod 2 thereby clamping the bracket 5 between the upper side supporting member 4 and the washer 9 through mounting rubbers 7 and 8. A spring 11 extends between the upper supporting member 4 and a lower supporting member 13 to bias the piston rod 2 in the upward direction or extending direction. An annular seat member 12 having a relatively small diameter tubular portion 12A and a radially extending flange portion 12B is secured to the main body 1 by such as welding and the like. The lower supporting member 13 is removably fitted on the tubular portion 12A of the seat member 12 for enabling the replacement or maintenance of the damper main body 1. The lower supporting member 13 includes a small diameter portion 13A removably fitted on the tubular portion 12A and abutting with the radial flange 12B, and a supporting portion 13B extending axially and radially outwardly from the upper end of the small diameter portion 13A and supporting the lower end of the spring 11. Shown at 14 is a mounting eye.

The prior art hydraulic damper having the aforesaid constitution is utilized in a vehicle suspension system by securing the bracket 5 on the body of the vehicle through screws 6 and the mounting eye 14 on such as a wheel axle of the vehicle.

When the hydraulic damper is not mounted on the vehicle, the spring force of the spring 11 tends to extend the piston rod to the most extended position, with the spring force being decreased to nearly zero. Thus, in handling or transporting the hydraulic damper, the lower supporting member 13 fitted on the seat member 12 tends to escape from the seat member 12. For preventing such shortcoming, the lower supporting member 13 has usually been secured to the seat member 12 by screws. However, this arrangement has the shortcoming that the mounting and dismounting operation is troublesome and time consuming.

SUMMARY OF THE INVENTION

The object of the present invention is to overcome the aforesaid shortcomings and, according to the invention, there is provided a hydraulic damper of the kind including a tubular main body, a piston rod slidably extending through one end of the main body, an annular seat member secured to a peripheral wall of the tubular main body, biasing means acting between the seat member and the projecting end of the piston rod for biasing the piston rod in the extending direction, and a supporting member detachably connected to the seat member and constituting a part of the biasing means, wherein a resilient retaining member is provided on the seat member and a retaining recess is formed in the supporting member for engaging with the retaining member, thereby maintaining the engagement between the retaining member and the seat member.

BRIEF DESCRIPTION OF THE DRAWINGS

Further features and advantages of the invention will become apparent from the following detailed description of preferred embodiments with reference to the accompanying drawings, in which:

FIG. 3 is a longitudinal sectional view of a second embodiment;

FIG. 4 is a longitudinal sectional view according to a third embodiment of the invention;

FIG. 5 is a perspective view of a seat member of FIG. 4;

FIG. 6 is a perspective view of a resilient ring of FIG. 4;

DETAILED DESCRIPTION OF THE PREFERRED EMBODIMENTS

Figure 1:
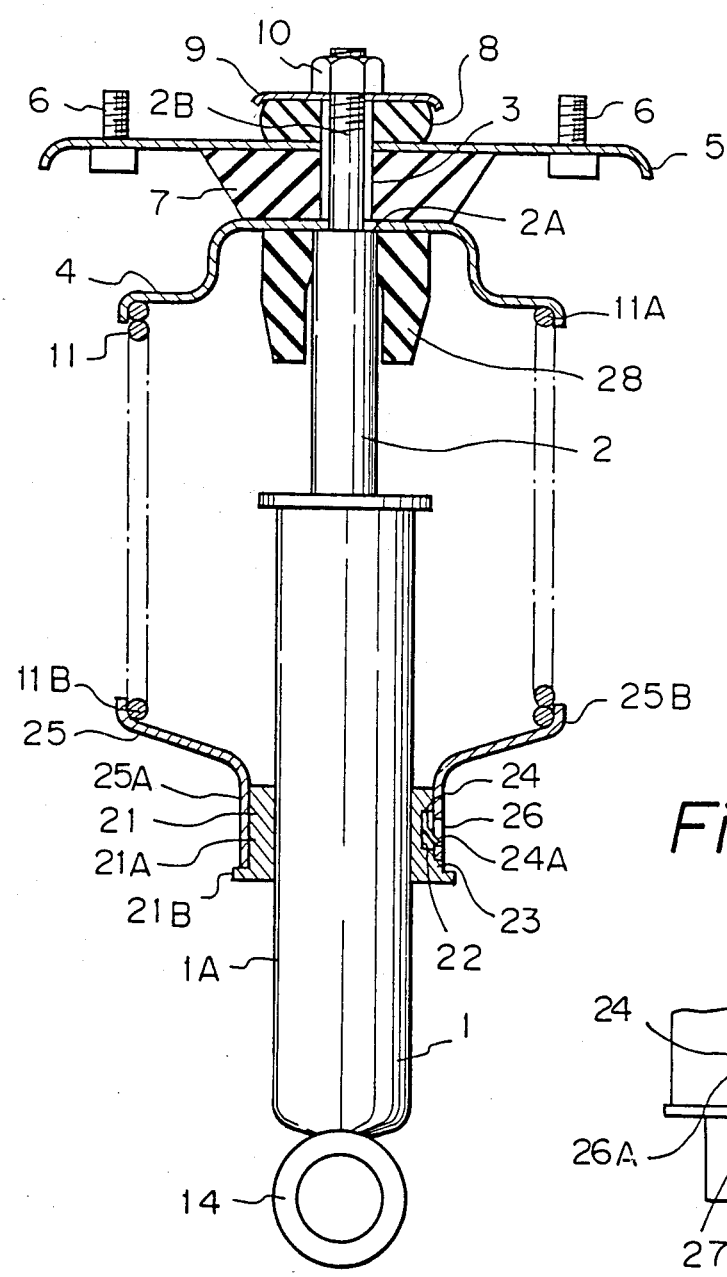
FIG. 1 is a longitudinal sectional view of a hydraulic damper according to a first embodiment of the invention.
Figure 16:
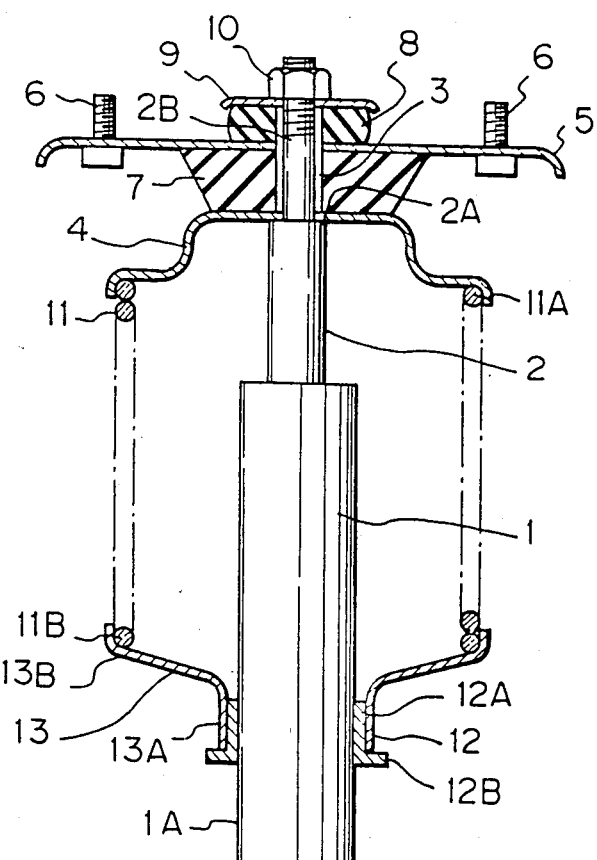
FIG. 16 is a longitudinal sectional view of a prior art hydraulic damper.

The hydraulic damper shown in FIG. 1 is generally similar to the prior art hydraulic damper shown in FIG. 16, and the same reference numerals are applied to similar parts and the description therefor is omitted.

Shown at 21 in FIG. 1 is an annular seat member secured to the peripheral wall 1A of the damper main body 1 and including a tubular portion 21A extending axially along the peripheral wall 1A, and an annular flange portion 21B defining an upwardly facing annular shoulder with the tubular portion 21A. Further, a generally rectangular groove 22 is formed in the outer peripheral surface of the tubular portion 21A, and a seat spring 24 acting as a resilient retaining member is received in the groove 22. The upper end portion of the seat spring 24 is secured to the bottom of the groove 22 by a screw. The seat spring 24 has a generally rectangular configuration with the lower end 24A projecting radially outwards to act as a retaining pawl.

Shown at 25 is a lower supporting member supporting the lower end 11B of the spring 11, and a small diameter portion 25A thereof is detachably fitted on the tubular portion 21A of the seat member 21, with the lower end thereof abutting with the annular flange 21B of the seat member 21. An opening 26 is formed in the small diameter portion 25A to co-operate with the retaining pawl 24A. Further, to prevent relative rotation between the seat member 21 and the supporting member 25, there are provided a projection 23 on the seat member 21 and a cutout 27 in the lower end portion of the circumferential wall of the supporting member 25.

In mounting the supporting member 25 on the seat member 21, it is required to simply fit the small diameter portion 25A of the supporting member 25 on the tubular portion 21A and to slide portion 25A downwardly along the tubular portion 21A. The lower end of the small diameter portion 25A abuts with the annular flange 21B with the cutout 27 engaging with the projection 23. The retaining pawl 24A of the seat spring 24 displaces radially outwards and is retained by lower end portion 26A of the opening 26 in the supporting member 25, thereby preventing upward displacement of the supporting member 25 relative to the seat member 21. To disassemble the supporting member 25 from the seat member 21, the retaining pawl 24A is simply displaced radially inwards against its resiliency by utilizing a suitable tool or a finger tip. The supporting member 25 then can easily be extracted from the seat member 21.

Figure 2:
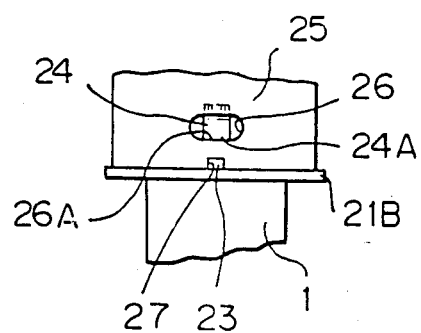
FIG. 2 is a partial side view of the damper of FIG. 1 showing an essential portion thereof.

Thus, according to the embodiment shown in FIGS. 1 and 2, the assembling and disassembling operations are very easy and simple and, the assembled condition can reliably be maintained and relative rotation between the seat member 21 and the supporting member can also be reliably prevented.

FIG. 3 shows a second embodiment of the invention wherein the spring 11 for biasing the piston rod 2 in the extending direction is replaced by an air spring unit 31, and the lower supporting member 25 in the first embodiment is replaced by a tubular member 38 having a lower small diameter portion 38A and an upper large diameter portion 38B and constituting a part of the air spring 31.

The air spring 31 comprises an upper supporting member 32 having an upper end 32A and an open lower end 32B, a rubber tube 34 having an upper end 34A secured to the lower end 32B of the upper supporting member through a mounting ring 33, a U-shaped bent portion 34B and a reduced diameter end 34C secured to the upper end of the large diameter portion 38B of the lower supporting member 38. The upper supporting member 32, the rubber tube 34 and the lower supporting member 38 define a closed chamber A. An air port 36 is provided to supply or to extract pressurized air into or from the closed chamber A. The upper end 32A of the upper supporting member 32 is clamped between a supporting plate 35 and the sleeve 3 and on the shoulder 2A of the piston rod 2 and is sealed by a seal ring 37. Shown at 28 in FIGS. 1 and 3 is a rebound stop. The lower end 38A of the lower supporting member 38 has formed therein an opening 26 and a cutout similar to cutout 27 of FIG. 1.

The operation and the function of the second embodiment supporting member 38 is fitted on the seat member 21 having a construction similar to that of the first embodiment. Annular seal members 39 and 40 are provided between the seat member 21 and the supporting member 38.

The construction for retaining the seat member 21 and the lower supporting member 38 together and for preventing relative rotation therebetween are similar to the first embodiment and, therefore, the same reference numerals are applied to corresponding parts and detailed description therefor is omitted.

FIG. 4–FIG. 6 show a third embodiment of the invention, wherein the construction for retaining the lower supporting member 38 with the seat member 21 in the second embodiment and for preventing relation rotation therebetween are modified as follows.

A seat member 41 secured to the peripheral wall 1A of the damper main body 1 has an annular groove 42 for receiving an annular resilient ring 44, two annular grooves 47 and 48 for receiving respectively seal rings 39 and 40, an annular flange 41B and a projection 43. The projection 43 engages with the cutout 27 in the lower supporting member 38 and with a cutout 44B in the resilient ring 44. A resilient pawl 44A is formed on the resilient ring 44 and projects into the opening 26 in the lower supporting member 38. A slit 44C is formed in the resilient ring 44 to permit the resilient ring 44 to be mounted in the annular groove 42 in the seat member 41.

Figure 7:
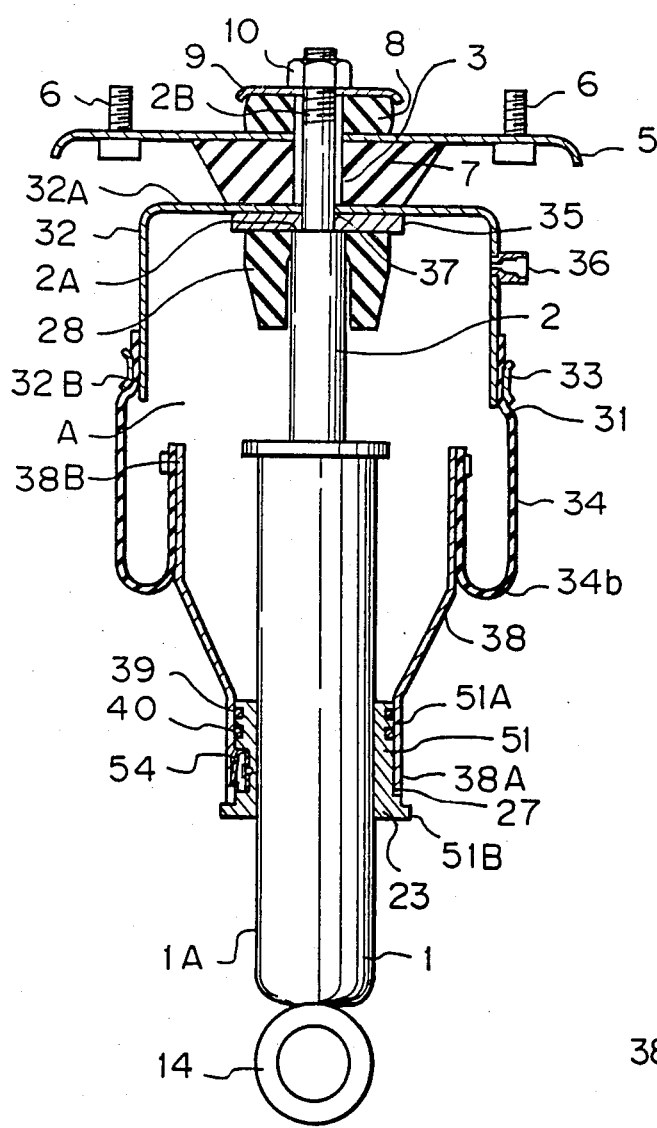
FIG. 7 is a longitudinal sectional view of a fourth embodiment of the invention.
Figure 8:
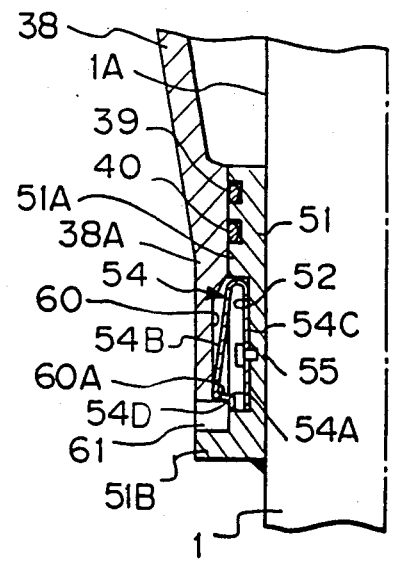
FIG. 8 is an enlarged partial sectional view showing an essential portion thereof.
Figure 9:
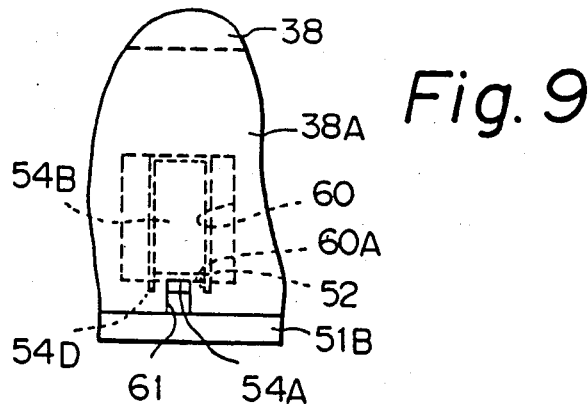
FIG. 9 is an enlarged partial side view thereof.
Figure 10:
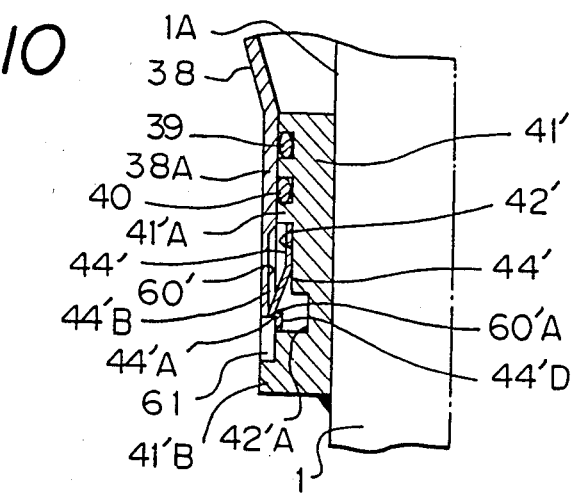
FIG. 10 is a partial longitudinal sectional view of a fifth embodiment of the invention.
Figure 11:
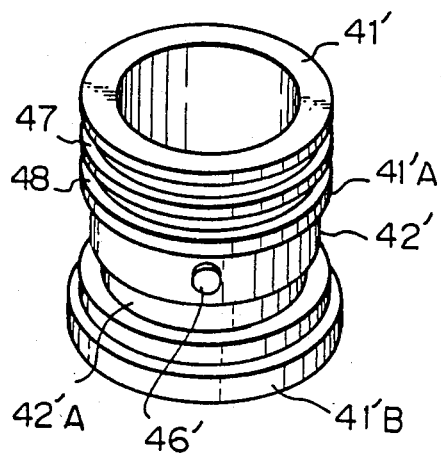
FIG. 11 is a perspective view of a seat member thereof.
Figure 12:
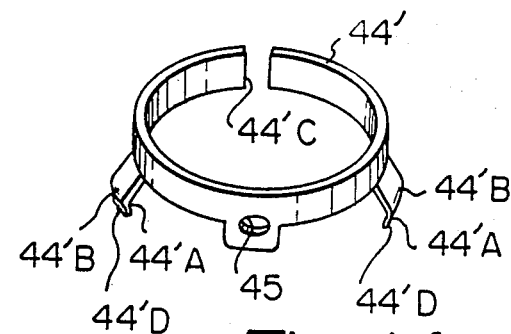
FIG. 12 is a perspective view of a resilient retaining member thereof.
Figure 13:
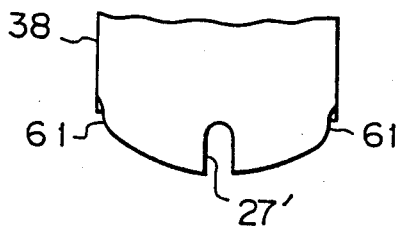
FIG. 13 is a partial perspective view of a lower supporting member thereof.

FIGS. 7–9 show a fourth embodiment of the invention, which minimizes the opening formed in the lower supporting member thereby preventing dirt and dust from entering into the space receiving the resilient retaining member. The damper is generally similar to the second and third embodiments, and thus, the same numerals are applied to corresponding parts and detailed description therefor is omitted. The small diameter lower end portion 38A of the lower supporting member 38 is detachably fitted on a seat member 51 which is secured to the peripheral wall 1A of the damper main body 1 and relative rotation therebetween is prevented by the recess 27 in the small diameter portion 38A and the projection 23 on the seat member 51. The seat member 51 has a generally rectangular recess 52 in the outer surface for receiving therein a resilient retaining member 54 formed of a leaf spring and bent into a generally U-shaped configuration having a mounting portion 54C secured to the bottom of the recess 52 by a screw 55, a resilient portion 54B extending downwardly and radially outwardly, a retaining portion 54A for engaging with a step 60A formed in the inner surface of the small diameter portion 38A and a downwardly extending operating portion 54D as shown in FIG. 8. A generally rectangular recess 60 is formed in the inner surface of the portion 38A of the lower supporting member 38 to define the step 60A. A small opening 61 is formed adjacent to the step 60A to permit the insertion of a suitable tool from the outside thereby pressing the operating portion 60D radially inwardly to release the retaining portion 54A from the step 60A.

FIGS. 10–13 show a fifth embodiment of the invention which is generally similar to the third and fourth embodiments shown in FIGS. 3–6 and FIGS. 7–9.

A seat member 41' has annular grooves 47 and 48 for receiving respectively seal rings 39 and 40, an annular groove 42' for receiving a ring-like shaped resilient retaining member 44', a flange 41'B and a mounting portion 46' for fitting with a mounting opening 45 in a retaining member 44'. The retaining member 44' can easily and reliably be located in the annular groove 42' in the circumferential direction. Further, two circumferentially space pawls 44'B acting as retaining portions are formed on the retaining member 44' as shown clearly in FIG. 12. The pawls 44'B are formed to have engaging portions 44'A for engaging with internal step 60'A which is formed as a part of a recess 60' in the internal surface of the lower end portion 38A of the lower supporting member 38. There are provided cutouts 61 in the lower end of the portion 38 for permitting insertion of suitable tool to press the operating portions 44'D of the resilient retaining members 44'B in the radially inward direction thereby disengaging portions 44'A from the step 60'A.

The operation of the fifth embodiment is similar to the fourth embodiment, however, it is possible to omit the screw 55 which simplifies the mounting operation and, since two resilient retaining members 44'B are provided at circumferentially spaced locations, the reliability of the retaining function is improved.

Figure 14:
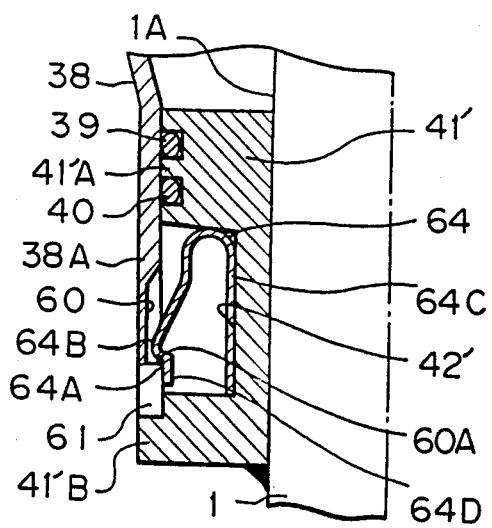
FIG. 14 is a partial longitudinal view of an essential portion of a sixth embodiment of the invention.

FIG. 14 shows a sixth embodiment of the invention which is generally similar to the fourth and fifth embodiments. In the drawing, a retaining member 64 has a generally annular portion 64C fitted on the bottom of annular groove 42' in the seat member 41' and two diametrically opposing resilient pawl portions 64B integrally extending from the annular portion 64C.

The operation and function of the sixth embodiment is similar to the fifth embodiment of the invention.

Figure 15:
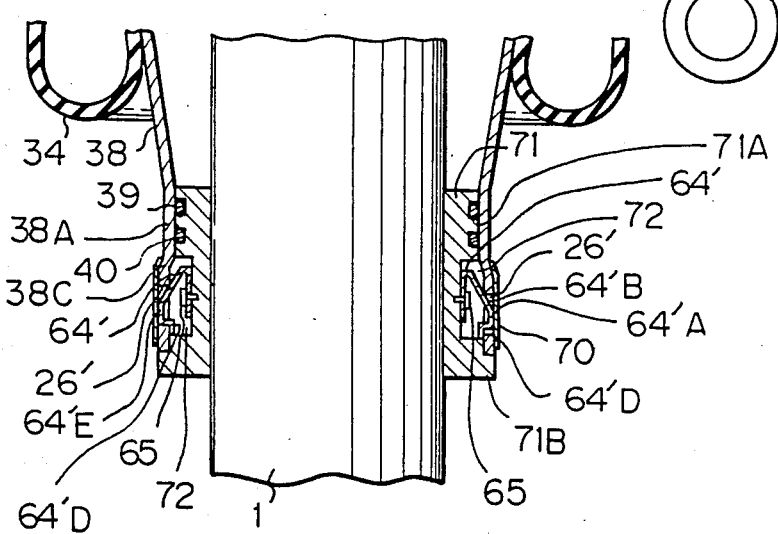
FIG. 15 is a partial longitudinal sectional view of a seventh embodiment of the invention.

FIG. 15 shows a seventh embodiment of the invention, wherein openings 26' formed in the lower end portion 38C of the lower supporting member for engaging with resilient retaining member 64' are closed by a rubber ring 70. Thus, the space receiving the resilient retaining member is protected from dust, water or dirt. The resilient retaining member 64' has pressing portions 64'E as shown in the drawing, and it is possible to radially inwardly displace the resilient pawl portions 64'B by pressing the rubber ring 70 from the outside utilizing finger tips or suitable tools.

As described heretofore, according to the invention, a mounting groove is formed in the outer circumferential surface of a seat member, an engaging groove is formed in the inner circumferential surface of a supporting member, one end of a resilient retaining member is located in the mounting groove, and the other end of the retaining member is disengageably engaged with the engaging groove, and thus, it is possible to reliably prevent the supporting member from escaping from the seat member. Further, in disassembling the supporting member from the seat member, it is possible to simply disengage the retaining member from the engaging groove by such as pressing the other end of the retaining member utilizing a suitable tool or the like, whereby the supporting member can easily be disassembled from the seat member.

What is claimed is:

1. In a hydraulic damper including a tubular main body, a piston rod slidably extending axially through one end of said main body, an annular seat member secured to a peripheral wall of said tubular main body, biasing means acting between said seat member and the projecting end of said piston rod for biasing said piston rod in an extending direction, and a supporting member detachably connected to said seat member and constituting a part of said biasing means, the improvement wherein:

a resilient retaining member is provided on said seat member and a retaining recess is formed in said support member for engaging with said retaining member, thereby maintaining engagement between said retaining member and said seat member.

2. The improvement claimed in claim 1, wherein a projection is formed on said seat member for engaging with a correspondingly shaped cutout formed in the lower end of said supporting member, thereby preventing relative rotation therebetween.

3. The improvement claimed in claim 1, wherein a rectangular recess if formed in the outer circumference of said seat member, said retaining member comprises a rectangular leaf spring having a radially outwardly projecting pawl portion on the lower end thereof and received in said rectangular recess in said seat member, and said retaining recess comprises a rectangular opening formed in said supporting member for engaging with said pawl portion of said leaf spring, thereby preventing said supporting member from slipping from said seat member.

* * * * *